US008456701B2

(12) United States Patent
Mestha et al.

(10) Patent No.: US 8,456,701 B2
(45) Date of Patent: Jun. 4, 2013

(54) REFERENCE COLOR DIFFERENCE QUANTITY GUIDE FOR SPOT COLOR APPLICATIONS

(75) Inventors: Lalit Keshav Mestha, Fairport, NY (US); Yonghui Zhao, Penfield, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 728 days.

(21) Appl. No.: 12/645,875

(22) Filed: Dec. 23, 2009

(65) Prior Publication Data

US 2011/0149313 A1 Jun. 23, 2011

(51) Int. Cl.
G06F 15/00 (2006.01)
H04N 1/40 (2006.01)
G06K 9/00 (2006.01)

(52) U.S. Cl.
USPC .............................. 358/1.9; 358/2.1; 382/167

(58) Field of Classification Search
None
See application file for complete search history.

(56) References Cited

U.S. PATENT DOCUMENTS

| | | | |
|---|---|---|---|
| 6,698,860 | B2 | 3/2004 | Berns et al. |
| 7,397,581 | B2 | 7/2008 | Mestha et al. |
| 8,031,938 | B2 * | 10/2011 | Edge .............................. 382/167 |
| 2005/0094169 | A1 | 5/2005 | Berns et al. |
| 2008/0043263 | A1 | 2/2008 | Hancock et al. |
| 2009/0257648 | A1 * | 10/2009 | Edge .............................. 382/162 |

OTHER PUBLICATIONS

U.S. Appl. No. 12/645,832, filed Dec. 23, 2009, Mestha et al.
U.S. Appl. No. 12/645,859, filed Dec. 23, 2009, Mestha et al.
U.S. Appl. No. 12/504,332, filed Jul. 16, 2009, Mestha et al.
U.S. Appl. No. 12/533,542, filed Jul. 31, 2009, Gil et al.
Wyble, David R. and Berns, Roy S., A Critical Review of Spectral Models Applied to Binary Color Printing, May 1, 1999, John Wiley & Sons, Inc., Rochester, NY. USA.
Ohno, Yoshi, Cie Fundamentals for Color Measurements, IS&T NIP16 Conference, Oct. 16, 2000, National Institute of Standards and Technology, Gaithersburg, MD, USA.
Susstrunk, Sabine and Holm, Jack and Finlayson, Graham D., Chromatic Adaptation Performance of Different RGB Sensors, IS&T/SPIE Electronic Imaging, SPIE vol. 4300, Jan. 2001, Swiss Federal Institute of Technology(EPFL), Lausanne, Switzerland.
Kheng, Leow Wee, Color Spaces and Color-Difference Equations, Feb. 19, 2002, Department of Computer Science, National University of Singapore, Singapore.

(Continued)

*Primary Examiner* — Barbara Reinier
(74) *Attorney, Agent, or Firm* — Philip E. Blair; Fleit Gibbons Gutman Bongini & Bianco P.L.

(57) ABSTRACT

What is disclosed is a novel system and method for generating a reference color difference quantity guide for spot color print applications. RCDQ values are determined for spot colors obtained from a library of spot colors. A reference color difference quantity guide is created from the spot colors and their respective RCDQ values in a manner more fully disclosed herein. Thereafter, when a user desires to render a job in a particular spot color, the associated RCDQ value for that spot color can be obtained from the reference color difference quantity guide. In various embodiments, recommendations in the form of a suggested printer to use, a media type, a halftone screen, and other meaningful assistance can be provided for selection of spot colors for a given print/copy job that are less sensitive to varying illuminations. The present RCDQ guide provides meaningful extensions in color reproduction in diverse print/copy job environments.

25 Claims, 10 Drawing Sheets

OTHER PUBLICATIONS

Sharma, Gaurav and Wu, Wencheng and Dalal, Edul N., The CIEDE2000 Color-Difference Formula: Implementation Notes, Supplementary Test Data, and Mathematical Observations, Feb. 9, 2004, ECE Department University of Rochester, Rochester, NY, USA.

Fairchild, Mark D., Color Appearance Models: CIECAM02 and Beyond, IS&T/SID 12$^{th}$ Color Imaging Cpnference Tutorial T1A, Nov. 9, 2004, RIT Munsell Color Science Laboratory, Rochester, NY, USA.

International Color Consortium, ICC Recommendations for Color Measurement White Paper No. 3 Level. Introductory, International Color Consortium, Dec. 2001, USA.

Susstrunk, Sabine and Finlayson. Graham D., Evaluating Chromatic Adaptation Transform Performance, Proc. IS&T/SID 13$^{th}$ Color Imaging Conference, Ecole Polytechnique Federale de Lausanne (EPFL), 2005, Lausanne, Switzerland.

Chen, Y. and Berns, R. S. and Taplin, L. A., Exploring the Color Inconstancy of Prints, AIC Colour 05-10$^{th}$ Congress of the International Colour Association, Munsell Color Science Laboratory, May 13, 2005, Rochester, NY, USA.

Finlayson, Graham D. and Susstrunk, Sabine, Performance of a Chromatic Adaptation Transform based on Spectral Sharpening, School of Information Systems, The University of East Anglia, Oct. 16, 2007, Norwich, UK.

Hunterlab, Color Inconstancy, vol. 12. No. 11, 2008, USA.

* cited by examiner

| AVG RCDQ > 2 FOR PANTONE SPOT COLORS | |
|---|---|
| Name | AVG RCDQ |
| PANTONE Cool Gray 10 U | 0.87 |
| PANTONE 7542 U | 1.37 |
| PANTONE 5235 U | 1.40 |
| PANTONE 657 U | 1.48 |
| PANTONE 5455 U | 1.64 |
| PANTONE 7541 U | 1.65 |
| PANTONE 656 U | 1.70 |
| PANTONE 5175 U | 1.75 |
| PANTONE 670 U | 1.77 |
| PANTONE 2706 U | 1.81 |
| PANTONE 622 U | 1.83 |
| PANTONE 538 U | 1.84 |
| PANTONE 7437 U | 1.84 |
| PANTONE 7429 U | 1.88 |
| PANTONE 7450 U | 1.90 |
| PANTONE 5575 U | 1.95 |
| PANTONE 665 U | 2.00 |

FIG. 6A

| AVG RCDQ > 5 FOR PANTONE SPOT COLORS | |
|---|---|
| Name | AVG RCDQ |
| PANTONE 5555 U | 5.00 |
| PANTONE 715 U | 5.01 |
| PANTONE 413 U | 5.02 |
| PANTONE 813 U | 5.03 |
| PANTONE 1935 U | 5.04 |
| PANTONE 501 U | 5.04 |
| PANTONE 698 U | 5.05 |
| PANTONE 528 U | 5.05 |
| PANTONE 245 U | 5.05 |
| PANTONE 2583 U | 5.06 |
| PANTONE 183 U | 5.06 |
| PANTONE 7508 U | 5.08 |
| PANTONE 2562 U | 5.08 |
| PANTONE 214 U | 5.09 |
| PANTONE 674 U | 5.09 |
| PANTONE 728 U | 5.09 |
| PANTONE 4535 U | 5.09 |
| PANTONE 231 U | 5.10 |
| PANTONE 7407 U | 5.11 |
| PANTONE 156 U | 5.12 |
| PANTONE 632 U | 5.12 |
| PANTONE 5787 U | 5.14 |
| PANTONE 252 U | 5.15 |
| PANTONE 578 U | 5.15 |
| PANTONE 389 U | 5.16 |
| PANTONE 7401 U | 5.17 |

| FROM FIG. 6B-1 | |
|---|---|
| PANTONE 550 U | 5.18 |
| PANTONE 687 U | 5.18 |
| PANTONE 5635 U | 5.18 |
| PANTONE 575 U | 5.18 |
| PANTONE 459 U | 5.19 |
| PANTONE 121 U | 5.19 |
| PANTONE 711 U | 5.20 |
| PANTONE 4755 U | 5.20 |
| PANTONE 5155 U | 5.20 |
| PANTONE 193 U | 5.21 |
| PANTONE 223 U | 5.22 |
| PANTONE 2572 U | 5.24 |
| PANTONE 7464 U | 5.25 |
| PANTONE 290 U | 5.25 |
| PANTONE 877 U | 5.26 |
| PANTONE 565 U | 5.26 |
| PANTONE 250 U | 5.27 |
| PANTONE 7404 U | 5.27 |
| PANTONE 394 U | 5.28 |
| PANTONE 386 U | 5.29 |
| PANTONE 814 U | 5.29 |
| PANTONE 515 U | 5.29 |
| PANTONE 516 U | 5.30 |
| PANTONE 686 U | 5.30 |
| PANTONE 1895 U | 5.30 |

REFERENCE COLOR DIFFERENCE QUANTITY GUIDE FOR SPOT COLOR APPLICATIONS

TECHNICAL FIELD

The present invention is directed to systems and method for generating a reference color difference quantity guide based upon a reference color difference quantity (RCDQ) metric calculated for a library of spot colors available on a digital front end (DFE) of a color print device for use in spot color print applications in a print/copy job environment.

BACKGROUND

Color is playing an increasingly important role in computer graphics. Broader affordability and availability of computer controlled systems with color processing capabilities will promote wider acceptance and use of color in document-intensive industries or document-intensive functional areas of enterprises. As a result, there is a steadily increasing use of computer based color presentation programs by computer users with little or no training in color science and in the aesthetic and technical uses of color. These users are often dissatisfied with the aesthetics of the final product produced by the color tools that are available. Users seldom are able to focus on the relationship among colors and color differences. Various color selection systems ignore principles of color perception theory that human perception of color is influenced by the effect of adjacent colors which a color is viewed, and the illumination under which that color is viewed. A perceptually uniform color space which more closely approximates how humans perceive colors and color differences facilitates color specification tasks. CIELAB color space is a perceptually uniform color space in which the numerical magnitude of a color difference bears a direct relationship to a perceived color appearance difference.

A seasoned color expert (human) may be able to visually determine which spot colors are best to use on a given marking device from a color difference perspective. However, the average user/customer of document reproduction devices is not likely to have the experience and visual acuity to select colors best viewed under different lighting sources. Having precise metrics, from a color difference perspective, for a given spot color at the start of a print/copy job greatly benefits system operators in their print/copy job environments.

Accordingly, what is needed in this art are increasingly sophisticated systems and methods for generating a reference color difference quantity guide based upon a reference color difference quantity metric calculated for a library of spot colors of a device for use in spot color print applications.

INCORPORATED REFERENCES

The following U.S. patents, U.S. patent applications, and Publications are incorporated herein in their entirety by reference.

"Production Of Color Conversion Profile For Printing", U.S. patent application Ser. No. 10/700,658, filed: Nov. 3, 2003.
"Adaptive Illumination Independent Matching of Spot Colors", U.S. patent application Ser. No. 12/504,332, filed: Jul. 16, 2009.
"Adaptive Illumination Independent Matching of Out-Of-Gamut Spot Colors Using Various Gamut Mapping Techniques", U.S. patent application Ser. No. 12/533,542, filed: Jul. 31, 2009.
"System And Method For Automated Spot Color Editor", U.S. patent Ser. No. 11/507,405, filed: Feb. 21, 2008.
"Billmeyer and Saltzman's Principles of Color Technology", Roy S. Berns, Wiley-Interscience, $3^{rd}$ Ed. (March 2000), ISBN-10: 047119459X, ISBN-13: 978-0471194590.
"Principles of Color Reproduction", John Yule, Gary Field, Graphic Arts Technical Foundation Press, 2nd Rev. Ed. (2001), ISBN-13: 978-0883622223.
"Color Constancy (The Wiley-IS&T Series in Imaging Science and Technology)", Marc Ebner (Author), Wiley; 1st Ed. (2007) ISBN-13: 978-0470058299.
"*Introduction to Color Imaging Science*", Hsein-Che Lee (Author), Cambridge University Press, $1^{st}$ Ed. Reissue (Mar. 19, 2009) ISBN-13: 978-0521103138.
"*Colorimetry: Understanding the CIE System*", Janos Schanda (Editor), Wiley-Interscience; Annotated Ed. (Aug. 10, 2007) ISBN-13: 978-0470049044.
"*CIE Fundamentals for Color Measurements*", Yoshi Ohno (Author), Proceedings IS&T NIP16 Intl. Conf. on Digital Printing Technologies, pp. 540-545 (October 2000).
"*ISO/CIE* 10526:1999, *CIE Standard Illuminants For Colorimetry*", (Paperback), American National Standards Institute (ANSI), (Aug. 23, 2007) ASIN: B000XYT21Q.
"*The CIEDE2000 Color-Difference Formula: Implementation Notes, Supplementary Test Data, and Mathematical Observations*", G. Sharma, W. Wu, E. N. Dalal, Color Research and Application, Vol. 30. No. 1, (February 2005).
"*Computational Color Technology*", Henry R. Kang (Author) SPIE Publications (May 17, 2006), ISBN-13: 978-0819461193.
*Measuring Colour*, R. W. G. Hunt (Author), Fountain Press Ltd, 3rd Ed. (January 2001), ISBN-13: 978-0863433870.
"*Chromatic Adaptation Performance of Different RGB Sensors*", S. Süsstrunk, J. Holm and G. D. Finlayson, Proc. IS&T/SPIE Electronic Imaging 2001: Color Imaging, Vol. 4300, pp. 172-183, (2001).
"*ICC Recommendations for Color Measurement*", ICC White Paper #3, ICC Consortium (2004).

BRIEF SUMMARY

What is disclosed is a novel system and method for generating a reference color quantity difference guide for use in spot color print applications in a print/copy job environment. RCDQ values are determined for spot colors obtained from a library of spot colors using a RCDQ metric, as is more fully described herein. A reference color quantity difference guide is created from the spot colors and their respective RCDQ values. Thereafter, when a user desires to render a job in a particular spot color, the associated RCDQ value for that spot color can be obtained from the reference color quantity difference guide such that the operator can determine whether or not the selected spot color has an increased likelihood of reference color quantity difference divergence. The present reference color difference quantity guide provides meaningful extensions in color reproduction and color quality optimization in diverse print/copy job environments.

In one example embodiment, the present method for generating a reference color difference quantity guide for spot color print applications involves the following. First, spot colors of interest are selected from a library of spot colors for a reference color marking device. The spot color library may include non-standard spot colors, i.e., user-defined spot colors, or standard spot colors from a known source such as, for instance, color defined by a Pantone® standard (i.e., PMS or GOE). A first and second color value are determined for each of the spot colors of interest. In various embodiments, the first color value is determined from spectral data taken from test patches printed for that spot color using a reference illuminant and reference observer angle. In various embodiments, the reference illumination is defined by a standard such as, for example, D50, and the reference observer angle is defined by a standard such as, for example, 2°. The reference illuminant may comprise a plurality of illuminants. The reference observer angle may comprise a plurality of observer angles. The first color value may be obtained from spectral data obtained using a spectral printer model of the color device in which an RCDQ value is to be determined. The first color value may be derived from L*a*b* values calculated from spectral data of the respective spot color for the reference illumination and observer angle. The second color value is determined from spectral reflectance measurements obtained for each of a plurality of illuminations and observer angles. In various embodiments hereof, the reference illumination and reference observer angle are defined by a standard illuminant such as, for example, D50, and a standard observer angle such as, for example, 2 degrees. The second color value is obtained from reflectance measurements taken from test patches of the respective spot colors printed using the color marking device in which an RCDQ value is to be determined. The second color value may alternatively be obtained from a model of the reference color marking device. Thereafter, a RCDQ value is calculated for each of the spot colors of interest based upon each spot color's respective first and second color values using a reference color difference quantity metric. A RCDQ value may also be calculated for any of: a printer, a media, and a halftone screen. The RCDQ values are then sorted to obtain a sorted list of RCDQ values and their respective spot colors of interest. The sorted list of RCDQ values is divided into at least a first section and a second section. The first section comprises spot colors with lower RCDQ values such that the respective spot colors have substantially similar reference color difference quantity values when rendered on different image output devices. The second section comprises spot colors with higher RCDQ values such that the respective spot colors have an increased likelihood of a reference color quantity difference divergence. Thereafter, the reference color quantity difference guide is generated from RCDQ values of at least the first section of the sorted list for use in spot color print applications. Various embodiments hereof have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 6A is an example reference color difference quantity guide generated in accordance herewith comprising at least a first section having an average RCDQ value of less than 2.0;

FIG. 6B is an example second section of the reference color difference quantity guide generated in accordance herewith comprising spot colors having an average RCDQ value of greater than 5.0;

DETAILED DESCRIPTION

What is provided is a system and method for generating a reference color difference quantity guide for spot color print applications. RCDQ values are determined for spot colors of interest obtained from a library of spot colors on a DFE of a customer's device. A reference color difference quantity guide is generated from the spot colors and their respective RCDQ values. As will become more apparent in the discussion hereof, the present reference color difference quantity guide provides meaningful extensions in color reproduction and color quality optimization in diverse print/copy job environments.

It should be understood that one of ordinary skill in this art would be readily familiar with many facets of color science such as, but not limited to, color spaces, reflectivity, spectral reflectance, spectral printer models for color print applications, CIE illuminants for colorimetry, and other techniques and algorithms common in the color science arts. Additionally, one of ordinary skill would be familiar with advanced techniques used for color manipulation, color transformation, and various aspects of color measurement as those taught in: "*Digital Color Imaging Handbook*", 1$^{st}$ Ed., CRC Press (2003), ISBN-13: 978-0849309007, and "*Control of Color Imaging Systems: Analysis and Design*", CRC Press (2009), ISBN-13: 978-0849337468, both of which are incorporated herein in their entirety by reference.

NON-LIMITING DEFINITIONS

A "job" refers to a logical unit of work in a document reproduction environment.

A "print/copy job" refers to a print job or a copy job processed on a document reproduction device. Example print/copy jobs include images (black/white or color), papers, documents, brochures, magazines, newspapers, photos and film, and the like.

Figure 7:
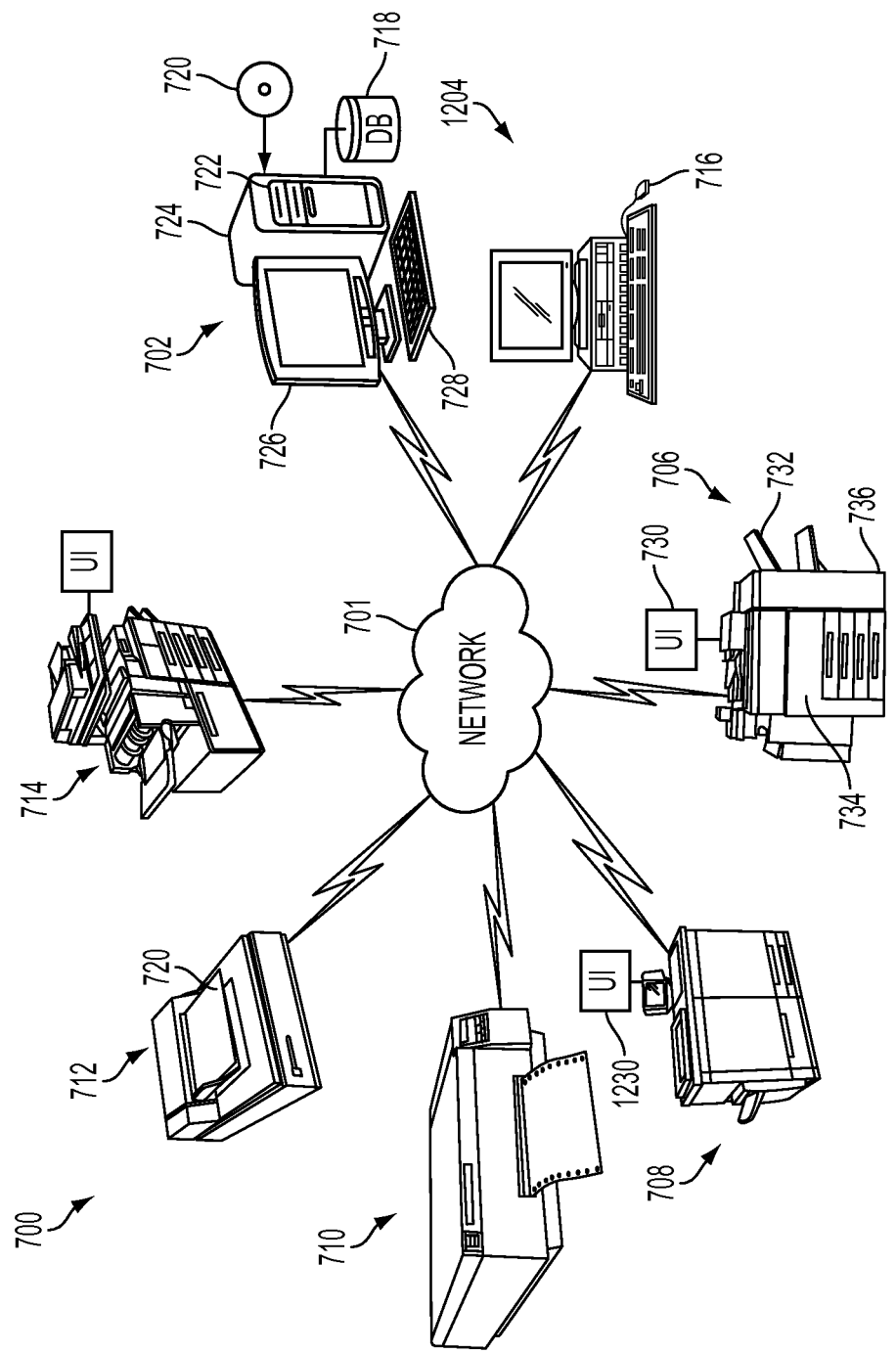
FIG. 7 illustrates one embodiment of an example networked print/copy job environment wherein various embodiments of the present reference color difference quantity guide finds their intended uses for spot color printing applications.

A "print/copy job environment" is a document reproduction environment, as illustrated by example in the example networked environment of FIG. 7, wherein a print/copy job is rendered to a hardcopy using for example, a printer, copier, or other marking device capable of rendering an image onto a media type. The terms "document production" and "document reproduction" are used interchangeably and are intended to mean the production of new documents and the reproduction of existing documents.

"Media type" refers to a surface on which a print/copy job is rendered. Media types typically found in a print/copy job environment can be defined by a set of attributes such as type, size, color, weight, etc. For instance, one media type can have an attribute such as: plain, lightweight, recycled, mylar, transparency, etc. A media type can have a size attribute such as:

letter, legal, executive, A4, A5, A6, etc. A media type can have a color attribute such as: blue, green, yellow, etc. Values such as: lb, gsm, etc., can be associated with a weight attribute. For example, the media type "A4 paper" may have the attributes: type—plain; size—21.0 cm×29.7 cm; color—white; weight—90 gsm.

An "image output device" is any device capable of rendering an image. The set of image output devices includes color marking devices such as, for instance, digital document reproduction device and other xerographic systems, photographic production and reproduction equipment as are widely known in commerce. An inkjet printer is one example image output device which receives a signal of an image and reduces the image to a viewable form by the visual integration of inks deposited onto a surface of a media substrate. An image output device includes various display devices such as monitors, projectors, holographic systems, and the like, which are also capable of rendering an image.

To "render" is to transform a signal of an image from one state to another such as, for example, receiving a signal of an image and reducing that signal to a viewable form such as a hardcopy print of the image. Rendering is also intended to include storing images to a memory or storage device, or otherwise communicating the image signal to another device such as a storage device. Such communication may take the form of transmitting, wirelessly or via a wire or cable, the image signal over a network such as a LAN or Internet.

A "storage device" refers to any device or system capable of storing electronic representations of documents or images. One example storage device is a database, as are well known in the arts, placed in communication with a computer system, workstation, server, or other device, that is either remote from or collocated with the device hosting a computing process that accesses and/or stores documents. Storage devices include RAM, ROM, cache memory, CD-ROM, DVD, flash drives, USB devices, internal/external hard drives, and other media or devices capable of storing electronic documents or images thereof.

"Illuminant" (or "Illumination") refers to standardized light source as defined by the International Commission on Illumination (CIE). The CIE publishes well-known standard illuminants, each of which known by a letter or by a letter-number combination. Illuminants of the A-series represent typical, domestic, tungsten-filament lighting with a correlated color temperature (CCT) of approximately 2856K. Illuminants of the B and C-series are daylight simulators. Illuminants of the D-series are natural daylight sources with D50, D55, D65 and D75 being common illuminants with CCT of approximately 5000K, 5500K, 6500K, and 7500K, respectively. At present, no artificial natural daylight source is recommended to realize CIE standard illuminant D65 or any other D-series illuminant of different CCT. Illuminants of the E-series are equal-energy illuminants. Illuminants of the F-series are fluorescent lamps of various compositions. F1-F6 are standard fluorescent lamps that consist of two semi-broadband emissions. F7-F9 are broadband fluorescent lamps with multiple phosphors. F10-F12 are narrow tri-band illuminants. One of ordinary skill would appreciate the use of illuminants in a spectral reflectance context.

A "standard observer" (also known as the "2° standard observer") refers to the CIE (1931) Standard Colorimetric Observer which defines a "standard observer" based upon studies with respect to chromatic responses of the human visual system viewing an object through a 2° angle (due to the original belief that the color-sensitive cones in the human eye all resided within a 2° arc of the fovea). A more modern, but less-used alternative, is the CIE 1964 10° Standard Observer which is recommended for more than a 4° field of view. Both the 1931 and 1964 standards are at discrete intervals of 5 nm wavelengths.

"CIELAB space" is an opponent-type color space, based on the opponent-color theory used to describe or model human color vision. In a color-opponent system, colors are mutually exclusive. For example, a color 'a' cannot be red and green at the same time, or yellow and blue at the same time. However, a color can be described in terms of red and blue, for example, purple. In a three-dimensional Euclidian coordinate view of opponent-type CIELAB color space, the two opponent coordinate axes are represented by a* and b* and describe the chromatic attributes of color. The a* axis represents the red-green coordinate. The b* axis represents the yellow-blue coordinate. Positive values of a* denote red colors. Negative values of a* denote green colors. Similarly positive values of b* represent yellows and negative values signify blues. The a* and b* coordinates are correlated to the postulated corresponding channels in the human visual system. The L* coordinate defines the perceptual correlate of a colors "psychometric lightness". Lightness is defined as the attribute of a visual sensation according to which the area in which the visual stimulus is presented appears to emit more or less light in proportion to that emitted by a similarly illuminated area perceived as a "white" stimulus. Lightness is an attribute of visual sensation that has meaning only for related visual stimuli, and may be referred to as "relative brightness". L* is in the range of 0 to 100. The central L* axis of the CIELAB color space lies perpendicular to the a*, b* plane and achromatic or neutral colors (black, grey, and white) lie on the L* axis at the point where a* and b* intersect (a*=0, b*=0). Colors specified as tristimulus values X, Y, and Z, can be located in Euclidian CIELAB space according to well-defined formulae.

"Tristimulus values" are the amounts of three primary colors (sets of colors that can be combined to make a useful range of colors) in a three-component additive color model needed to match a given test color. Tristimulus values are most often given in the CIE XYZ color space (1931) which serves as a basis from which many color spaces are defined. The CIE XYZ color space was deliberately designed so that the Y is a measure of the brightness or luminance of a color. Tristimulus values can be calculated using color-matching functions for a particular source of illumination if the reflectance spectrum of a given color sample is known. Alternatively, tristimulus values (XYZ) of a color may be directly measured by a tristimulus-filter colorimeter. If two color stimuli have the same tristimulus values, they will appear the same under the same viewing conditions by an observer whose color vision is not significantly different from that of a standard observer. The two color stimuli will produce what is called a "metameric" match between colors. Thus, colors with identical tristimulus values viewed under identical conditions provide the common and device independent link between differing color reproduction technologies.

The tristimulus values (XYZ) for standard illuminant D50 are computed, in one embodiment, using the following:

$$X = 100 \frac{\sum_\lambda R(\lambda) D_{50}(\lambda) x(\lambda)}{\sum_\lambda D_{50}(\lambda) y(\lambda)}$$

-continued $$Y = 100 \frac{\sum_\lambda R(\lambda)D_{50}(\lambda)y(\lambda)}{\sum_\lambda D_{50}(\lambda)y(\lambda)}$$

$$Z = 100 \frac{\sum_\lambda R(\lambda)D_{50}(\lambda)z(\lambda)}{\sum_\lambda D_{50}(\lambda)y(\lambda)}$$

$R(\lambda)$ = Refectance spectra $D_{50}(\lambda)$ = Standard illuminant $\lambda = [380 \quad 730]$ $x(\lambda), y(\lambda), z(\lambda)$, are color matching functions The tristimulus values (XYZ) for a given color with a spectral power distribution $I(\lambda)$ given in terms of a standard observer, is defined by:

$$X = \int_0^\infty I(\lambda)\bar{x}(\lambda)d\lambda,$$

$$Y = \int_0^\infty I(\lambda)\bar{y}(\lambda)d\lambda,$$

$$Z = \int_0^\infty I(\lambda)\bar{z}(\lambda)d\lambda,$$

where $\lambda$ is the wavelength of the equivalent monochromatic light (in nanometers), and $\bar{x}(\lambda), \bar{y}(\lambda), \bar{z}(\lambda)$ are the CIE (1931) defined color matching functions which can be thought of as the spectral sensitivity curves of three linear light detectors that yield the CIE XYZ tristimulus values X, Y, and Z.

The relationship between L*a*b* values and the tristimulus values (XYZ) is defined, in one embodiment, by the following:

$$L^* = 116\left[f\left(\frac{Y}{Y_n}\right) - \frac{16}{116}\right]$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(x) = \begin{cases} x^{\frac{1}{3}} & \text{if } x \geq 0.008856 \\ 7.787x + \frac{16}{116} & x \leq 0.008856 \end{cases}$$

where $X_n, Y_n, Z_n$, are tristimulus values for the reference white.

A "spot color" is any color generated by an ink (pure or mixed) that can be printed using a single run. Spot colors are used to reproduce colors that are difficult to produce using standard inks. Many widely-used print processes are composed of four spot colors: Cyan (C), Magenta (M), Yellow (Y), and Black (Key), commonly referred to as CMYK. More advanced hexachromatic print processes are composed of six spot colors, which add Orange (O) and Green (G) to the four-color process (collectively termed CMYKOG). The two additional colors (OG) are added to compensate for the often inefficient reproduction of faint tints using only CMYK colors. Known spot color classification systems include: Pantone®, Toyo, DIC, ANPA, GCMI, and HKS. A common standard reference for spot color work is Pantone®. Spot color proofs are typically supplied in the form of colored samples which can be separated and individually measured.

A "spot color of interest" is intended to refer to all or a subset of spot colors in a library of spot colors available on a digital front end (DFE) of a given image output device. A spot color of interest is intended to also cover non-standard spot colors that may come from looking at prints from hardcopy samples which may have been printed with any known printing technology (e.g., offset lithographic, gravure, flexography, xerography, inkjet etc).

A "spectral reflectance value" refers to a value obtained from one or more spectral reflectance measurements. Spectral reflectance or reflectance spectrum, is usually given as $R(\lambda)$, where $\lambda$ is the wavelength (in nanometers) of an equivalent monochromatic light. Spectral reflectance values can be retrieved from a storage device or measured using a reflectance spectrum measuring device, such as a spectroradiometer or spectrophotometer which samples a stimulus at a number of different wavelengths. Reflectance spectrum measurements may be obtained when a marking substance is in an intermediate state such as, for instance, when toner is adhered to a photoreceptor (belt, drum, etc.) prior to being transferred and fused to a media substrate.

A "Reference Color Difference Quantity Metric" is a measure of a device's ability to reproduce colors under various illuminants. The Reference Color Difference Quantity Metric focuses on appearance under specific illuminants and can be expressed using well known color difference equations.

A "RCDQ value" or ("Reference Color Difference Quantity Value") is a value produced using various embodiments of the Reference Color Difference Quantity Metric, as defined herein further. In one embodiment, RCDQ values are obtained using a D50 illuminant as the reference illumination at an observer angle of 2 degrees. A maximum, 95%, and avg RCDQ value can be obtained for the reference illuminant. These calculations are then performed across remaining illuminants with a second illuminant as the reference. One RCDQ value is obtained for the second reference illuminant. Repeating these computations across the remaining illuminants with one of them acting as a reference each time gives the sample's color dispersion value (max, 95%, avg RCDQ) across a variety of illuminants.

In one embodiment, the Reference Color Difference Quantity Metric produces a RCDQ value as follows:

$$RCDQ(I_R,I) = \sqrt{[(L_I(sp_R) - L_I(CMYK_{IR}))^2 + (a_I(sp_R) - a_I(CMYK_{IR}))^2 + (b_I(sp_R) - b_I(CMYK_{IR}))^2]},$$

where I is the illuminant under consideration, $I_R$ is for the reference illuminant, $sp_R$ is the reflectance spectrum of the reference color, and $CMYK_{IR}$ is the CMYK value obtained by a spot color recipe search method that best matches the reference color under a reference illuminant. For example, if $I_R$ is chosen as the D50 illuminant then $I_I(CMYK_{IR})$ is the L* value of the measured spot color for illuminant I (D65, D75, etc.,) which is produced with a recipe ($CMYK_{IR}$) at D50 illuminant. $L_I(sp_R)$ is the target L* value of the target spot color spectra under illuminant I. Similarly, a* and b* are calculated and RCDQ values obtained corresponding to those illuminants. If $CMYK_{IR}$ of the print system produces the spectra that matches $sp_R$ then RCDQ will be zero under any illuminant condition.

In another embodiment, the Reference Color Difference Quantity Metric produces an RCDQ value based upon the $\Delta E2000$, as follows:

$$RCDQ(I_R,I) = \Delta E2000[L_I(sp_R)a_I(sp_R)b_I(sp_R),L_I(CMYK_{IR})a_I(CMYK_{IR})b_I(CMYK_{IR})].$$

It should be appreciated that the symbol CMYK in [0057], [0058] and [0059] stands for the CMYK toner of a printer, taken as an example. For a printer with other inks (toners), CMYK should be replaced with the corresponding inks (toners).

Example Flow Diagram of RCDQ Embodiment

Figure 1:
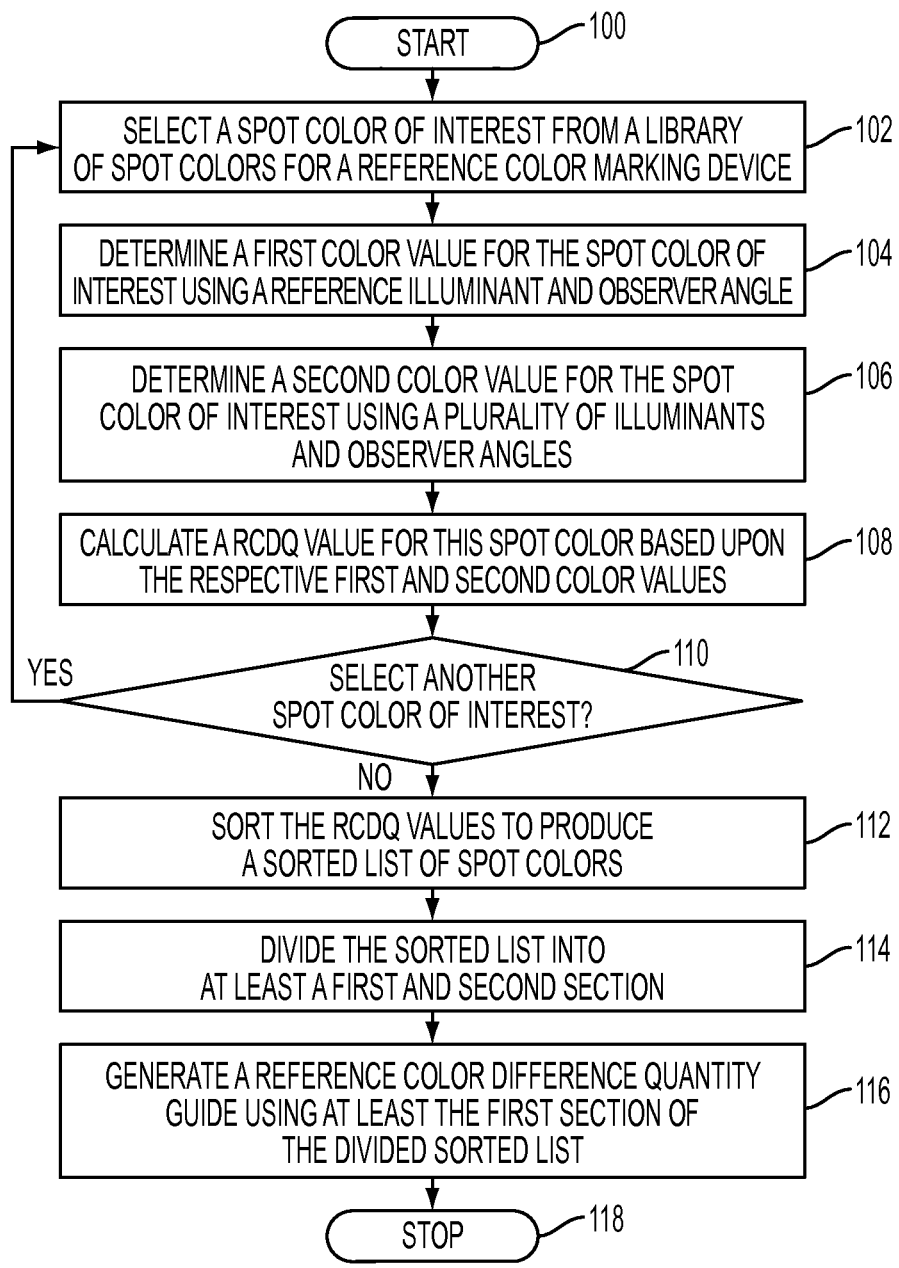
FIG. 1 is a flow diagram of one example embodiment of the present method for generating the present reference color difference quantity guide for spot color printing applications.

Reference is now being made to the flow diagram of FIG. 1 which illustrates one example embodiment of the present method for generating the reference color difference quantity guide for use in spot color print applications. Flow processing starts at step 100 and immediately proceeds to step 102.

At step 102, select a spot color of interest from a library of spot colors available for a reference color marking device. The library of spot colors may be non-standard user-defined color or may comprise standard colors such as: Pantone®, Toyo, DIC, ANPA, GCMI, and HKS. Some or all of the spot colors in the library may be of interest depending on the print application. The library of spot colors may be retrieved, either one at a time or as a group, from a storage device such as database 718 of FIG. 7, or obtained from a remote device over a network. In various embodiments, the retrieved spot colors are displayed a graphical display device such as a touchscreen device and the user selects all or a subset of the displayed spot colors. In such an embodiment, the user utilizes a user interface, such as a keyboard or mouse, to identify the library of spot colors for the reference color marking device. One or more records containing the identified user-selected library of spot colors can be retrieved from the database in response to the user selection. One such example user interface is shown and discussed with respect to the computer system 704 of FIG. 2 and the networked print/copy job environment of FIG. 7.

At step 104, determine a first color value for the spot color of interest selected in step 102 for a reference illuminant and reference observer angle using a reference color marking device. In various embodiments, the reference illumination and observer angle are defined by a standard such as, for example, D50 and 2°. The reference illuminant may comprise a plurality of illuminants and the reference observer angle may comprise a plurality of observer angles. The first color value may alternatively be obtained from spectral data using a spectral printer model of the color device for which the RCDQ value is to be determined. The first color value may be derived from $L^*a^*b^*$ values calculated from spectral data of the respective spot color for the reference illumination and observer angle. The first color value may alternatively be obtained from a colorimeter. In various embodiments, the first color value is determined from spectral data taken from test patches for that spot color printed by a reference color marking device using a reference illuminant and reference observer angle. The first color value may be provided or retrieved from a storage device or a remote device via a network, such as the network of FIG. 7, or obtained directly from a scanning device.

At step 106, determine a second color value for the spot color selected in step 102 for a plurality of illuminations and observer angles using the color marking device for which the RCDQ value is to be determined. The second color value may be obtained from a spectral printer model of the color device for which an RCDQ value is to be determined. The second color value may alternatively be derived from $L^*a^*b^*$ values calculated from the spectral data obtained for each of a plurality of illuminations and observer angles. The second color value may alternatively be obtained from a color model of the reference color marking device. The color model may be a spectral printer model of the device for which the RCDQ value is to be determined. The spectral printer model is capable of determining a color value for each of the plurality of illuminations and observer angles. Any of the second color values may be stored or retrieved from a storage device or from a remote device via a network, such as the network of FIG. 7, or obtained directly from a scanning device.

It should be appreciated that spectral data are obtained for a given spot color using a reflectance spectra measuring device. One such device is a spectrophotometer which samples a stimulus applied to a sample color at a number of different wavelengths. Another such device is a spectroradiometer which measures the spectral power distribution a sample spot color under a given geometrical condition. Such devices are well known and are typically calibrated to a reference standard traceable to a national laboratory. Spectral reflectance (or reflectance spectra) is usually given as $R(\lambda)$ where $\lambda$ is the wavelength in nanometers of an equivalent monochromatic light. One of ordinary skill will appreciate that measurements using spectrometers or like spectral reflectance measuring devices are subject to various sources of error such as, for instance, wavelength scale shifts, stray light, bandwidth, scanning interval, detector nonlinearity, and input optics imperfections. Uncertainties in such measurements depend not only on the type of instrument used but also how the instrument is set up and the measurements performed. Spectra data may be obtained from a marking substance which is in an intermediate or transitory state such as, for instance, when toner is adhered to a photoreceptor (belt, drum, etc.) prior to being transferred and fused to a media substrate. Any of the spectral data or measurements from which the first and second color values are derived may be retrieved from a storage device or obtained from a remote device over a network, such as the network of FIG. 7.

At step 108, calculate at least one RCDQ value for the selected spot color of interest based upon the spot color's respective first and second color values using a Reference Color Difference Quantity Metric. The calculated spectral matching values are based upon the first and second color values obtained in steps 104 and 106, respectively. A RCDQ value for the selected spot color of interest may be calculated for any of: a printer, a media type, and a halftone screen. Such RCDQ values may further be processed to obtain a single RCDQ value for a given selected spot color of interest. The RCDQ values may further be provided to a storage device such as storage device 718 of FIG. 7. Any interim values generated during any of the RCDQ value computations including formulas and software routines needed to perform the calculations which generate the RCDQ values for a given spot color of interest may also be provided to a storage device for subsequent retrieval or communicated to a remote device over a network.

At step 110, a determination is made whether any more spot colors of interest remain to be selected. If so, then processing proceeds to step 102 wherein a next spot color of interest is selected. Processing repeats until at least one RCDQ value has been determined for all selected spot colors of interest.

At step 112, sort the RCDQ values to produce a sorted list of spot colors and their respective RCDQ values. In one embodiment, the list is sorted from a lowest RCDQ value to a highest RCDQ value. In another embodiment, the sorting is from a highest RCDQ value to a lowest RCDQ value. Both sorting ways (highest-to-lowest or lowest-to-highest) are intended to fall within the scope of the appended claims. It should be appreciated that the association of spot colors with their respective RCDQ values is retained during sorting. Methods for sorting a list of numerical values with associated fields are well established. The sorted list can be stored to a storage device or up-loaded over a network to a remote device such as a database or a computer system. The sorted list of RCDQ values can further be displayed on a display device for a user to review. Optionally, the user can use a user interface to manipulate the sorted list by, for example, adding additional information to the list, removing existing values from the list, or editing any of the RCDQ values or spot colors on the list.

At step 114, divide the sorted list of spot colors into at least a first and second section. The first section of the sorted list comprises spot colors with lower RCDQ values such that the respective spot colors have substantially similar reference color difference quantity values. Spot colors of the second section have higher RCDQ values such that the respective spot colors have an increased likelihood of reference color difference quantity divergence. In one embodiment, spot colors of the first section of the sorted list have an associated respective RCDQ value less than or equal to 2.0. Spot colors which have an associated respective RCDQ value greater than 2.0 reside in the second section of the sorted list. It should be understood that a numerical value other than 2 can be used to divide the sorted list of spectral matching values into a first and second section are intended to fall within the scope of the appended claims.

In various embodiments, all or portions of the sorted list of RCDQ values are displayed on a display device, such as a touchscreen. In such an embodiment, a user selects or otherwise enters a desired numerical value which divides the sorted list into a first and second section. Such a user selection may be based upon an experience level with different print devices, different media types, and different halftone screens. In other embodiments, the numerical value which divides the sorted list of RCDQ values into a first and second section is determined by other means. Such other means may include further computation or may be as simple as, for example, the existence of a "break" or "gap" in the sorted list of RCDQ values which divides the sorted list into a first and second section.

Embodiments which divide the sorted list of spectral matching values into a plurality of different sections are also intended to fall with the scope of the appended claims. For instance, the sorted list may be divided into a first section containing spot colors with low (or very low) RCDQ values, a middle section, and a last section of spot colors which have high (or very high) RCDQ values. Such lines of demarcation or bifurcation may depend entirely on a user's experience level or may be derived from a model or a result of further computation. Spot colors in a middle section may be deemed to have "intermediate" RCDQ values which may or may not have an increased likelihood of reference color difference quantity divergence. Spot colors residing in such a middle section of the divided list may require further determination. Whereas, spot colors of the last section may have RCDQ values that are deemed to be "dangerous" or "at risk" when used on a particular color marking device.

In other embodiments, only spot colors residing in the first section are retained and spot colors in the middle and last section are discarded or disregarded. Some or all of the RCDQ values and their respective spot colors in any section of the sorted list may be provided to a storage device for storage and subsequent retrieval or communicated to a remote device over a network, such as a color marking device wherein the communicated sections are reduced to a hardcopy form. Some or all of the RCDQ values and their respective spot colors of interest may be communicated to a remote device over a network for display, storage, or further processing.

At step 116, generate a reference color difference quantity guide from at least the first section of the divided sorted list. In various embodiments, generating the reference color difference quantity guide comprises printing some or all of the RCDQ values and their respective spot colors in the divided sorted list. Generating the reference color difference quantity guide may comprise communicating one or more RCDQ values and their respective spot colors over a network to a remote device, such as for example, a computer system or workstation, wherein some or all of the values comprising the guide are displayed. Generating the reference color difference quantity guide may further comprise providing the sorted RCDQ values and their respective spot colors to a storage device and/or displaying all or a portion of the sorted list for a user review. The reference color difference quantity guide may include all sections of the divided sorted list. Thereafter, processing stops at 118.

A hardcopy of the reference color difference quantity guide can then be provided to the customer for use in spot color print applications in their respective print/copy job environments. Various sections of the divided list may have a mark or border which visibly demarcates the sectional divisions. Headings and other information may be further provided with one or more sections. When the customer thereafter desires to render a particular print/copy job in a selected spot color of interest, the associated RCDQ value for that spot color can be obtained from the reference color difference quantity guide to determine an amount of reference color difference quantity divergence and act accordingly. In response to a user query, for example, a range of RCDQ values can be retrieved from the reference color difference quantity guide. The RCDQ values can be retrieved and displayed on a display device for the customer. The user can then select one or more spot colors based upon the displayed RCDQ values.

In another embodiment, in response to a spot color having been selected by a user for a given print/copy job on a selected color marking device, the reference color difference quantity guide is queried by the device itself to obtain that spot color's respective RCDQ value. If the spot color's respective RCDQ value is determined to be above a pre-defined value determined, for instance, by a standard or set by a manufacturer of the device, a notification can be automatically provided to the user that the chosen spot color has an increased likelihood of reference color difference quantity divergence. In instances wherein various embodiments of the present system and method are integrated with one or more device controllers, the device itself further initiates pre-defined protocols which, in turn, activate on or more device controllers to prevent the print copy/job from continuing using the present spot color selection. In such an embodiment, recommendations and other assistance can be displayed or otherwise provided to the user or operator of the device. Such recommendations in the form of, for example, a better spot color to use for improved quality, another printer to use in the print/copy job environment, various printer settings to select, another media type to select, or a halftone screen configuration to use. Such assistance may take the form of audio, video, email, telephonic, or other forms of communication. These recommendations can be further associated with one or more fields of the guide or embedded in a list of recommendations which, in turn, associated with the spot colors of the sorted list. Such notifications may be communicated to a manager, engineer, or, for example, manufacturer's representative, or the like, who is otherwise familiar with configuration of the print/copy job environment wherein various embodiments of the present system and method find their intended uses.

In such a manner, various embodiments of the present reference color difference quantity guide each provide meaningful extensions in color reproduction and color quality optimization in diverse print/copy job environments.

Example Functional Block Diagram

Figure 2:
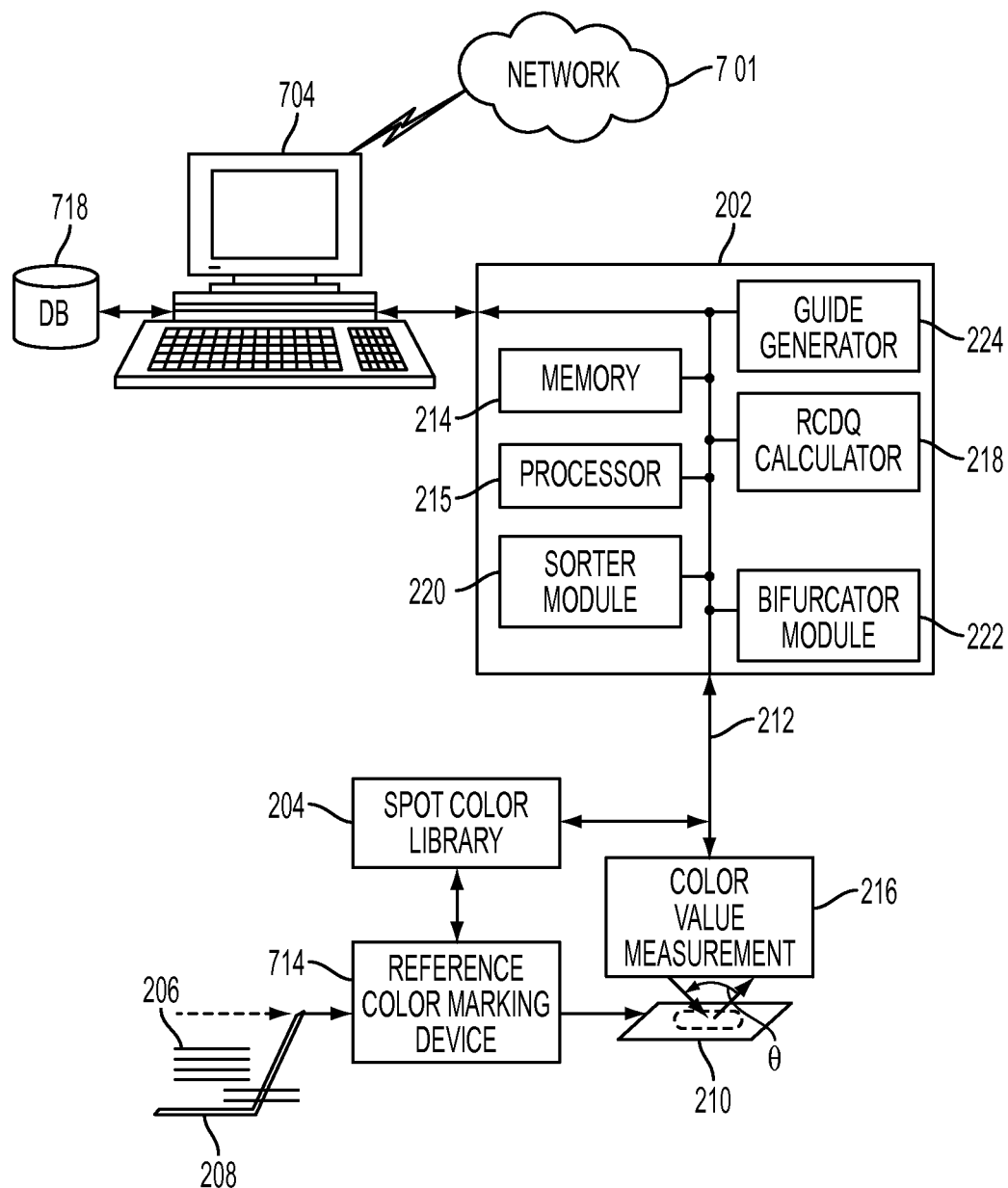
FIG. 2 is a functional block diagram of one example embodiment of the present system and method for generating a reference color difference quantity guide for spot color print applications in accordance with the flow diagram of FIG. 1.

Reference is now being made to FIG. 2 which illustrates an example block diagram of one embodiment of the present system and method for generating a reference color difference quantity guide for spot color print applications in a print/copy job environment. The embodiment of FIG. 2, is shown generally comprising elements of the example networked document reproduction environment 1200 of FIG. 12. Some of the elements of FIG. 2 are similarly labeled to various elements of FIG. 12 and thus a repeat discussion as to these elements has been omitted in the discussion hereof.

In FIG. 2, computer system 704 is shown in communication with database 718 and network 701, in a manner as previously described, and further in communication with processing block 202 wherein various features and embodiments of the present method, as described with respect to the flow diagram of FIG. 1, are performed. Media type 206 is retrieved from media storage area 208 and provided to reference color marking device 714 whereon a spot color from spot color library 204 is printed. The media marked with the spot color of interest (shown generally at 210) is then provided to color value measurement device 216. The color value measuring device can be a spectrophotometer, a colorimeter, or a scanner, for example. A first color value 215, in this embodiment, comprises a color value defined by a standard illumination and standard observer angle. The first color value may be retrieved from computer system 704 or from a remote device over network 701. The second color value is obtained from measurements obtained, for each spot color of interest, from test patches printed using the respective spot colors using the color value measurement device 216 using a plurality of illuminants and observer angles. The first and second color values and their respective spot color are provided via communication bus 212 to processing block 202 wherein the first and second color values are stored in memory 214. The above process, as further described with respect to the flow diagram of FIG. 1, repeats for each selected spot color of interest.

Inside processing block 202, processor 216 retrieves the obtained first and second color values from memory 214 and provides the two values, either serially or in parallel, to RCDQ calculator 218 wherein a RCDQ value is calculated for each respective spot color using any of the embodiments previously described with respect to the above-defined Reference Color Difference Quantity Metrics. RCDQ calculator 218 utilizes memory 214 as temporary storage or may further access information and other data from database 718, and software routines from computer 704, or from a remote device over network 701. After the RCDQ values have been calculated for each respective spot color, these values are provided to sorter module 220 wherein, in this embodiment, the RCDQ values are sorted from, for example, a lowest RCDQ value to a highest RCDQ value. Spot colors with lower spectral matching values have substantially similar spectral reflectance values when rendered on different image output devices and thus will have a decreased likelihood of spectral divergence. Whereas, spot colors with higher spectral matching values have an increased likelihood of spectral divergence.

The sorted list is provided by sorter module 220 to bifurcator module 222 wherein the sorted list is divided into at least a first section of spot colors. Bifurcator module 222 can, in various embodiments, receive a bifurcation value from a user input via user interface of computer system 704. The sorted bifurcated list is provided to guide generator module 224 wherein at least the first section of the sorted bifurcated list is reduced to a hardcopy. In this example embodiment, guide generator module 224 provides the sorted bifurcated list over network 701 to any of the devices shown and discussed with respect to the networked print/copy job environment of FIG. 7. In another embodiment, guide generator module 224 communicates at least the first section of the sorted bifurcated list over a network to a remote computer system. Guide generator module 224, in response to a user input, may further store at least the first section of the sorted bifurcated list to a storage device such as, for example, storage device 718, or display at least a first section of the sorted bifurcated list to the display device of computer system 704.

It should be appreciated that a "module", "processing block", or "unit", refers to a system component comprising either software or hardware, or a combination of both, which performs a certain function, as will be explained herein further. A plurality of such modules may collectively perform a function. A module may be implemented using a single software program comprising, in part, machine readable program instructions, or a single piece of hardware such as, for example, an ASIC, electronic circuit, or special purpose processing system such as the special purpose computer of FIG. 8. A plurality of modules may be executed by either a single system or a plurality of systems operating in parallel. Connections between modules may include both physical and logical connections. The term "system" includes one or more software and/or hardware modules which may further comprise an operating system, device drivers, device controllers, and other apparatuses, some or all of which may be connected via a network.

RCDQ Values for Offset and iGen4 Print Devices

Figure 3:
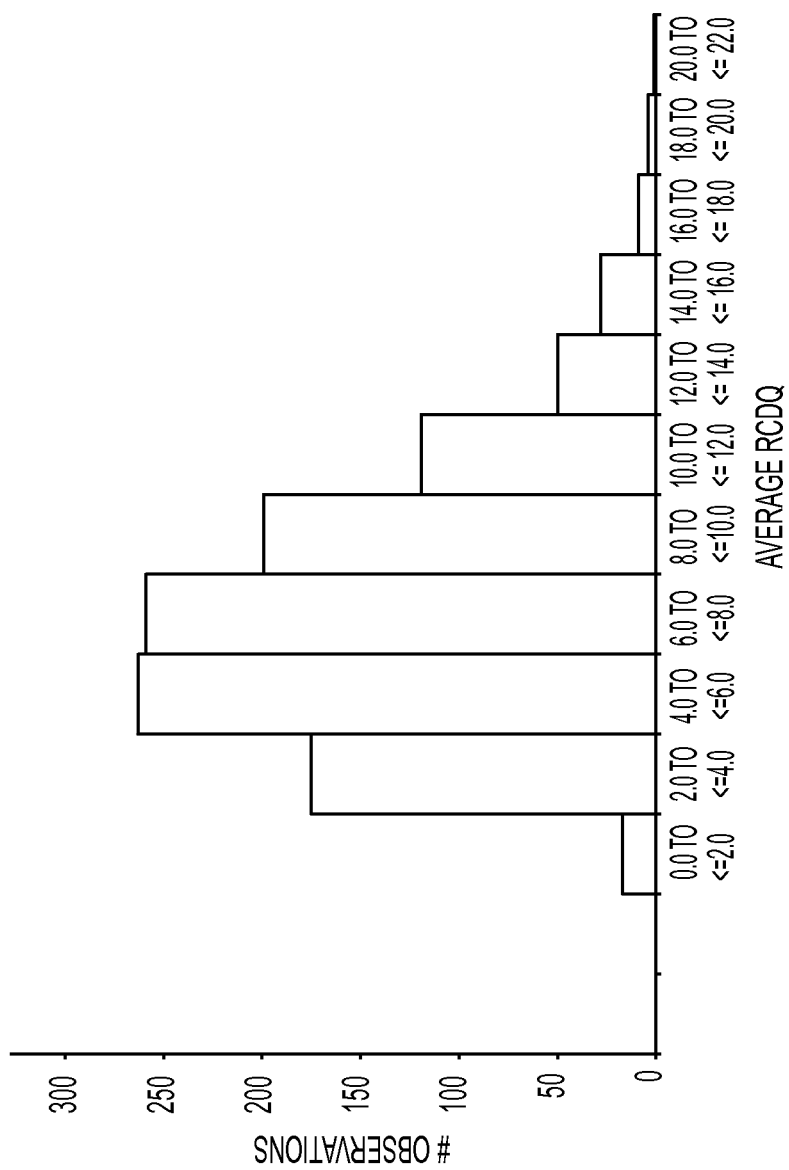
FIGS. 3-5 show the histogram of the average, 95 percentile, and maximal RCDQ, for all 1124 Pantone® colors.
Figure 4:
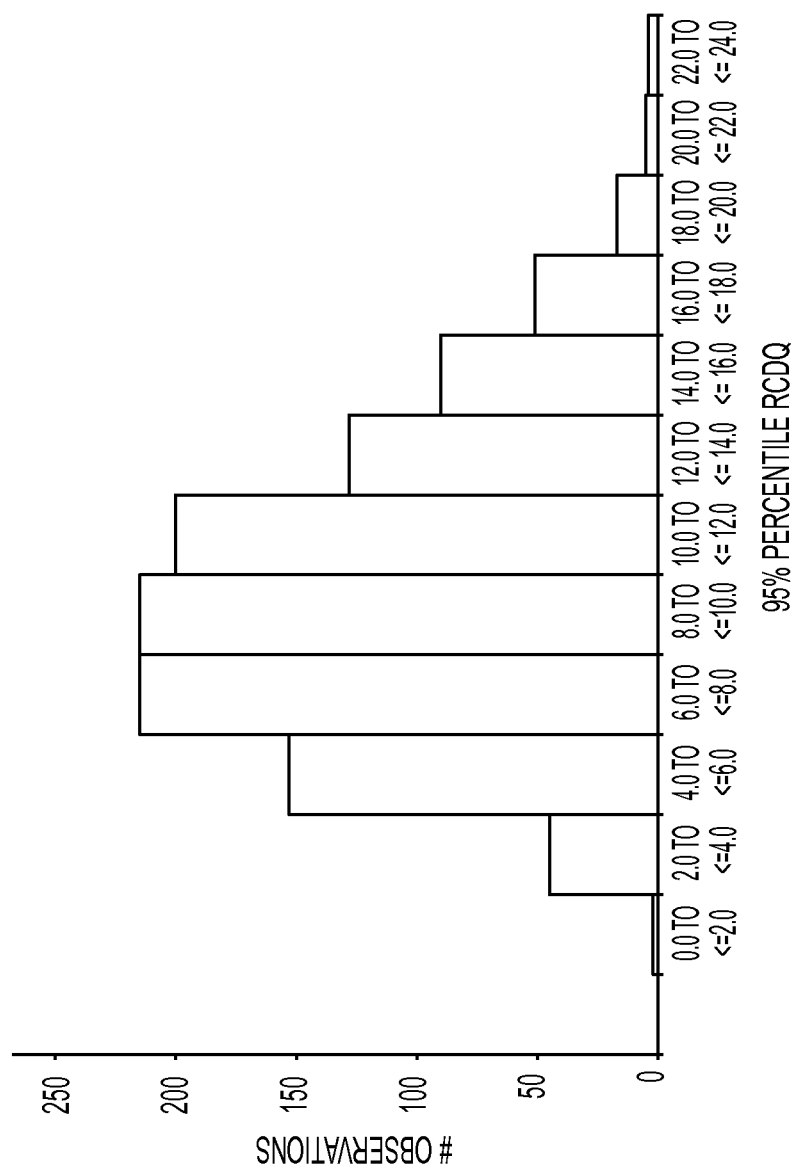
Figure 5:
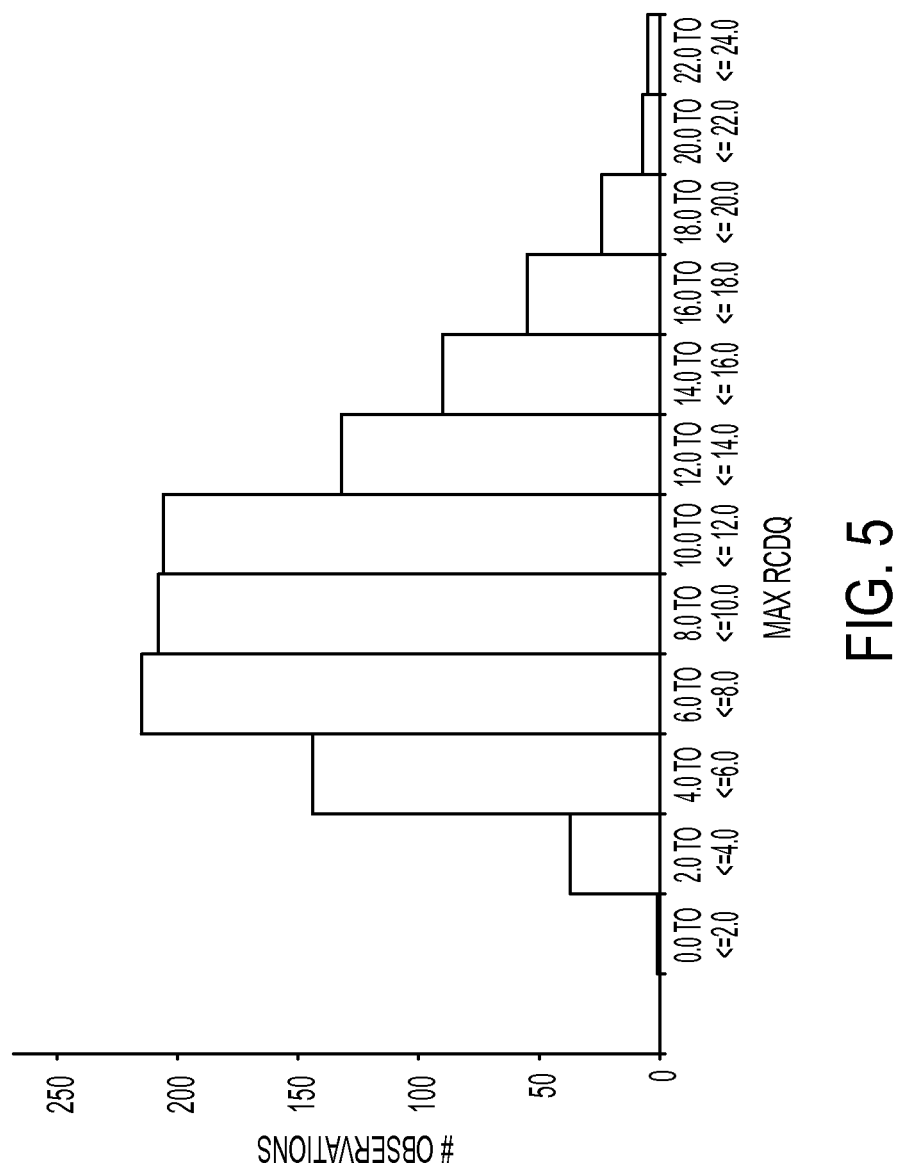

FIGS. 3-5 show the histogram of the avg, 95%, and max RCDQ, for 1124 Pantone colors for an Offset Printer over a number of observations.

FIG. 6A is an example reference color difference quantity guide generated in accordance herewith comprising at least a first section having an average RCDQ value of less than 2.0. FIG. 6B is an example second section of the reference color difference quantity guide generated in accordance herewith comprising spot colors having an average RCDQ value of greater than 5.0. Spot colors of FIG. 6A colors have lower RCDQ values and thus are determined to have substantially a similar reference color difference quantity when rendered on different image output devices as determined by the Reference Color Difference Quantity Metric. Spot colors of FIG. 6B with higher RCDQ values are determined to have an increased likelihood of reference color difference quantity divergence.

Using the generated guide, the operator or manager of the print/copy job environment will take this information into consideration when selecting spot colors for print jobs. This information is very useful to the operator of complex document reproduction devices in a print/copy job environment before decisions are made as to specific print devices to use for the various spot color applications.

Example Networked Print/Copy Job Environment

Reference is now being made to FIG. 7 which illustrates one embodiment of an example networked print/copy job environment wherein various embodiments of the present spectral matching guide finds their intended uses for spot color printing applications. The following is intended to provide a general description of a suitable environment in which the present method and system may be implemented. It should be understood that other environments are equally capable of effectuating various features of the present system and method.

In FIG. 7, networked document reproduction environment 700 is shown generally having computer systems connected to various print and copy devices over network 701. Such a networked environment may be wholly incorporated within the confines of a single print/copy job center or facility, or may be distributed among different locations. Document reproduction environment 700 includes computer server 702 and desktop computer 704 wherein various embodiments of the present method are performed. Computers 702 and 704 can be any of a desktop, laptop, server, mainframe, or the like, as are common in the arts. In one embodiment, a spectral matching guide generated in accordance with the teachings hereof is provided by computer 704 to server 702 for distribution over the network. Print/copy job environment 700 includes a plurality of image input devices and image output devices 706-714. Computers 702 and 704 are capable of receiving a print/copy job from scanning device 712, print/copy devices 706, 708, 710, and 714, over network 701 and sending that job to any of the output devices 706-714. Scanning device 712, as is common in the arts, is capable of digitizing a document (not shown) which has been placed on platen 720, and providing a digital representation of the scanned document over network 701 to any of the other networked devices shown.

Computer system 702 is in communication with computer system 704 and print/copy devices 706-714 via network 701. All the other devices shown in the illustrated networked configuration of FIG. 7 are also in communication with each other via network 701. Many aspects of network 701, illustrated as an amorphous cloud, are commonly known and may include the Internet, WIFI, or LAN. A further discussion as to the construction and/or operation of the network or the internet itself has been omitted. Suffice it to say, data is transmitted in packets between networked devices via a plurality of diverse communication links such that one device with access to the network can communicate with another device over the network using established protocols. Data is transferred in the form of signals which may be, for example, electronic, electromagnetic, optical, infrared, or other signals. These signals are provided to a device such as a server 702, which transmits and receives data packets by means of wire, cable, fiber optic, phone line, cellular link, RF, satellite, or any other communications link known in the arts. Computers 702-704 and devices 706-714 each include a network interface card (not shown) which facilitates the transmission of data over network 701.

Computers 702 and 704, and various devices of document reproduction environment 700, include at least one processor capable of executing machine readable program instructions for performing various operations thereon including various embodiments of the present system and method as described with respect to any portions of the example flow diagram of FIG. 1 and the example block diagram of FIG. 3. Computers 702-704 also each have a hard disk (not shown) internal in computer cases 724. Computers 702 and 704 are capable of reading and writing to storage device 722 wherein a computer readable medium such as a floppy disk, magnetic tape, optical disk, CD-ROM (shown at 720), DVD, etc., is inserted (or mounted) for loading/reading/storing software programs, files, data, records, and the like. Computing devices 702-704 further comprise a memory, communications link (as will be discussed herein further), a display device 726 such as a CRT or LCD as a visual display of information and a keyboard 728 for manual data entry. Computer 704 is shown with mouse 716. Computer system 702-704 include a communications interface which acts as both an input/output to allow software and data to be transferred to/from external devices placed in communication therewith. Example communications interfaces include a modem, a network interface (such as an Ethernet card), a communications port, a PCMCIA slot and card, etc.

In the embodiment shown, computer system 702 implements database 718 wherein various spot color libraries and various entries of the first and second sections of the sorted lists comprising the spectral matching guide produced in accordance herewith, may be stored and all, or portions thereof, retrieved in response to a query. Although the database is shown as a external device, the database will likely be internal to computer system 702 mounted on a hard disk contained therein. Database 718 is capable of indexing a plurality of records, receiving and interpreting a query, and retrieving one or more of the appropriate records in response to the query. The database is also capable of adding new records and updating existing records already stored. Records stored in the database can be indexed, retrieved, modified, and updated by system 702. Depending on the level of sophistication of the print/copy job environment 700 and the needs of the end-users thereof, any of the networked devices may be placed in communication with system 702 to access/update database 718. It should be clearly understood that a record, as used herein with respect to database 718, is intended to mean any data structure containing information which can be indexed, stored, and searched and retrieved by a database engine in response to a query. Such a record can be configured though a software construct to contain any number of fields of information. Such constructs are well known in the database arts. Since techniques for database construction, optimization, indexing, query optimization, and record retrieval are well known in the arts, a further discussion as to a specific database implementation is omitted herein. Suffice it to say that one of ordinary skill would be able to purchase a database from a vendor which is capable of storing and retrieving records in response to a query.

Devices 706, 708, and 714 include a user interface (UI) 730 through which user instructions and selections may be manually entered. User interface 730 is any conventional user interface found in the arts and may include data entry devices such as a keyboard, numeric pad, and a mouse. In one embodiment, user interface 730 comprises a touchscreen display. Device 706 includes a paper tray 732, a processing control unit (shown generally at 734), and one or more paper trays 736 for retaining a variety of print media/stock. One or more of devices 706, 708, and 714 further incorporates various features, capabilities, and functionality of scanner 712. Printer 710 is a printer of simple constructions, as opposed to the complex design of the other devices in the example networked print/copy job environment 700.

Many complex document reproduction devices, as shown with respect to devices 706, 708, and 714, can configure internal pathways to, for example, transport a certain type of print media having a particular size or orientation. Such complex systems have many such components capable of being configured based up on media attributes entered or otherwise selected by a user/operator. In complex print systems, such as devices 706, 708, and 714, the operator may manually enter or change one or more of a device's configuration settings through user interface 730 to ensure optimal device performance and job quality for a given selected media type desired for that print job, in part, based upon the recommendations provided with the present spectral matching guide. A display on the print/copy device, which is of course one of many possible displays retained in a memory associated with user interface 730, includes device-specific program instructions for instructing the processor control unit 734 to configure the print/copy device based on the attributes entered for a media type loaded in paper tray 736. User interface 730 includes controls for programming a range of values for the attributes for the various types of print media, allowing the print media loaded in a paper tray to be utilized for a variety of print jobs. User interface 730 includes controls for programming the specific system settings to configure the print/copy devices based upon media type attributes.

Any of the networked devices 702-716 may include an Ethernet or similar card to connect to network 701 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality. It is well known that document reproduction printing systems are capable of communicating and/or reporting via bi-directional protocols such as Internet Printing Protocol (IPP), Job Definition Format (JDF), or Simple Network Management Protocol (SNMP).

Example Special Purpose Computer

Figure 8:
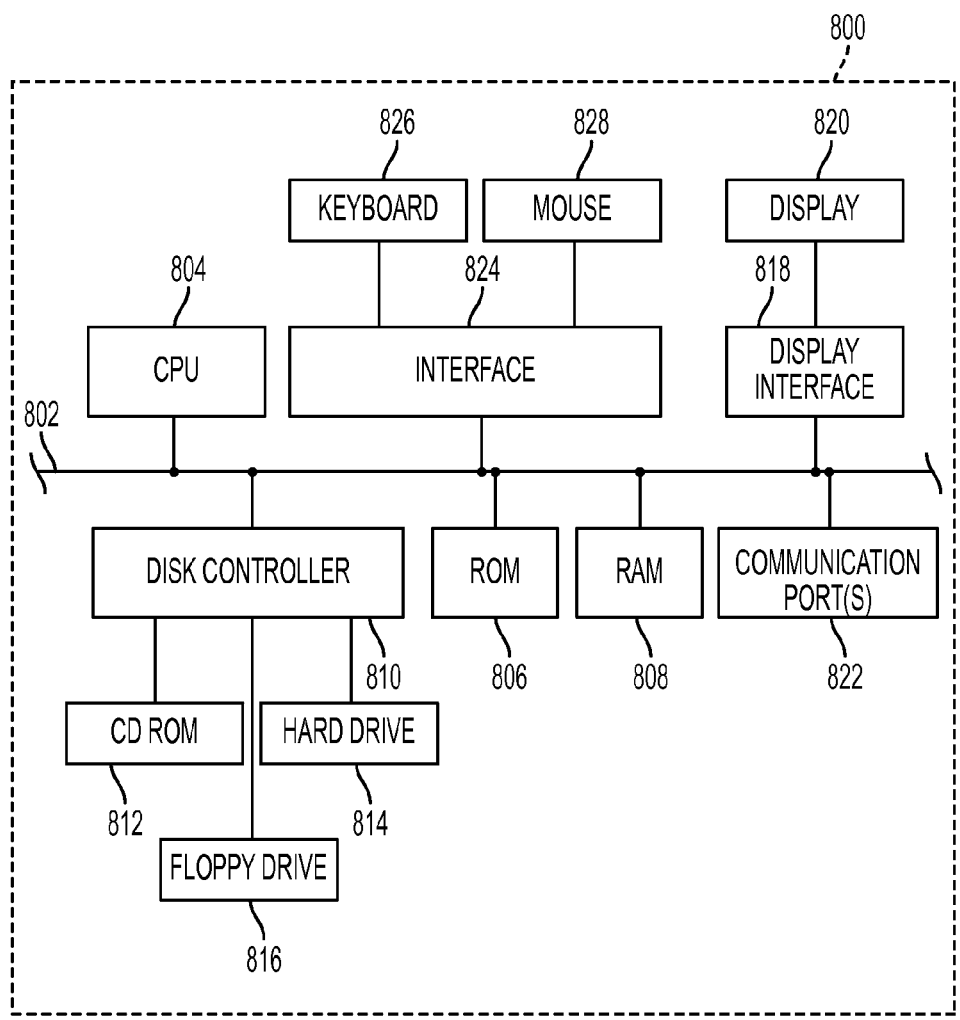
FIG. 8 illustrates a block diagram of one example embodiment of a special purpose computer system for performing one or more aspects of the present system and method as described with respect to the example flow diagram of FIG. 1 and the example functional block diagram of FIG. 2.

Reference is now being made to FIG. 8 which illustrates a block diagram of one example embodiment of a special purpose computer system for performing one or more aspects of the present system and method as described with respect to the example flow diagram of FIG. 1 and the example functional block diagram of FIG. 2. Such a special purpose processor is capable of executing machine readable program instructions for carrying out one or more aspects of the present method and may comprise any of a micro-processor or micro-controller, ASIC, electronic circuit, or special purpose computer system. Such a system can be integrated, in whole or in part, with a xerographic system, color management system, or image processing system, or any of the devices of the networked print/copy job environment of FIG. 7. All or portions of the flow diagram of FIG. 1 and the functional block diagram of FIG. 2, as illustrated and described herein, may be implemented partially or fully in hardware in conjunction with machine executable instructions in communication with various components of such a system.

The special purpose computer incorporates a central processing unit (CPU) 804 capable of executing machine readable program instructions for performing any of the calculations, comparisons, logical operations, and other program instructions for performing the methods described above with respect to the flow diagrams and illustrated embodiments hereof. The CPU is in communication with Read Only Memory (ROM) 806 and Random Access Memory (RAM) 808 which, collectively, constitute example memory storage devices. Such memory may be used to store machine readable program instructions and other program data and results to sufficient to carry out any of the functionality described herein. Disk controller 810 interfaces with one or more storage devices 814. These storage devices may comprise external memory, zip drives, flash memory, USB drives, memory sticks, or other storage devices with removable media such as CD-ROM drive 812 and floppy drive 816. Machine executable program instructions execute the methods hereof or perform any of the functionality show with respect to the above-described embodiments. Computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein.

Display interface 818 effectuates the display of information on display device 820 in various formats such as, for instance, audio, graphic, text, and the like. Interface 824 effectuates a communication via keyboard 826 and mouse 828. Such a graphical user interface is useful for a user to review any of the identified objects and/or user markings and for entering information about any of the displayed information in accordance with various embodiments hereof. Communication with external devices may occur using example communication port(s) 822. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 822 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for generating a reference color difference quantity guide for spot color print applications in a print/copy job environment, the method comprising:
    selecting spot colors of interest from a library of spot colors for a reference color marking device;
    determining a first color value and a second color value for each of said spot colors of interest, said first color value being determined for a reference illumination and reference observer angle, and said second color value being determined for each of a plurality of illuminations and observer angles;
    calculating, using a reference color difference quantity metric, a RCDQ value for each spot color of interest based upon each spot color's respective first and second color values;
    sorting said RCDQ values to obtain a sorted list of RCDQ values and their respective spot colors of interest;
    dividing said sorted list of RCDQ values into at least a first section and a second section, said first section comprising spot colors of interest with lower RCDQ values such that the respective spot colors have substantially similar RCDQ values when rendered on different image output devices, and said second section comprising spot colors with higher RCDQ values such that the respective spot colors have an increased likelihood of reference color difference quantity divergence;
    generating a reference color difference quantity guide using spot colors of interest from at least a portion of said first section of said sorted list and their respective RCDQ values; and
    communicating said reference color difference quantity guide to a storage device.

2. The method of claim 1, wherein said first color value comprises a color defined by a standard illumination and standard observer angle, and wherein said second color value is obtained from measurements of test patches of said respective spot colors printed using said color marking device in which an RCDQ value is to be determined.

3. The method of claim 1, wherein said first color value is obtained from L*a*b* values calculated from spectral data of said respective spot color for said reference illumination and reference observer angle, and wherein said second color value is obtained from L*a*b* values calculated from spectral data for each of said plurality of illuminations and observer angles.

4. The method of claim 1, wherein said reference illumination comprises a plurality of illuminants and wherein said reference observer angle comprises a plurality of observer angles.

5. The method of claim 1, wherein said first color value is obtained from a colorimeter, and wherein said second color value is obtained determined using a color model of said reference color marking device.

6. The method of claim 5, wherein said color model comprises a spectral color model capable of determining at least one color value for each of said plurality of illuminations and observer angles.

7. The method of claim 1, wherein obtaining said second color value comprises:
    printing a test patch of said spot color using said reference color marking device; and
    measuring said second color value from said printed test patch using any of: a spectrophotometer, a colorimeter, and a scanner.

8. The method of claim 1, wherein calculating said RCDQ value for each spot color of interest further comprises calculating a RCDQ value for each of: a printer type, a media type, and a halftone screen.

9. The method of claim 1, wherein generating said reference color difference quantity guide comprises any of:
    printing, using an image output device, at least said first section of said sorted list to produce a hardcopy;
    communicating at least said first section of said sorted list over a network to a remote computer system;
    storing at least said first section of said sorted list to storage device; and
    displaying at least said first section of said sorted list on a display device.

10. The method of claim 1, further comprising:
    querying said reference color difference quantity guide in response to a desired spot color having been chosen for use by a target color marking device;
    providing, in response to said querying, said desired spot color's respective RCDQ value;
    determining whether said desired spot color's respective RCDQ value is in said first section of said sorted list; and
    providing, in response to said desired spot color's RCDQ value not being in said first section of said sorted list, a notification that said desired spot color has been determined to have an increased likelihood of reference color difference quantity divergence.

11. The method of claim 1, further comprising providing a recommendation for better reference color difference quantity matching comprising any of: another spot color to use, a printer to use, a media type to use, and a halftone screen to use.

12. The method of claim 1, further comprising:
retrieving, in response to a user query, a range of RCDQ values from said reference color difference quantity guide; and
displaying said retrieved range of RCDQ values on a display.

13. The method of claim 1, wherein calculating said RCDQ value comprises calculating any of: an average, 95%, and a maximum color dispersion, for each of said plurality of illuminants.

14. A system for generating a reference color difference quantity guide, the system comprising:
a memory;
a storage medium for storing data;
a color value measurement device; and
a processor in communication with said memory, said storage medium, and said color value measurement device, said processor executing machine readable instructions for performing the method of:
selecting spot colors of interest from a library of spot colors for a reference color marking device;
determining a first color value and a second color value for each of said spot colors of interest using said color value measurement device, said first color value being determined for a reference illumination and reference observer angle, and said second color value being determined for each of a plurality of illuminations and observer angles;
calculating, using a reference color difference quantity metric, a RCDQ value for each spot color of interest based upon each spot color's respective first and second color values;
sorting said RCDQ values to obtain a sorted list of RCDQ values and their respective spot colors of interest;
dividing said sorted list of RCDQ values into at least a first section and a second section, said first section comprising spot colors of interest with lower RCDQ values such that the respective spot colors have substantially similar RCDQ values when rendered on different image output devices, and said second section comprising spot colors with higher RCDQ values such that the respective spot colors have an increased likelihood of reference color difference quantity divergence; and
generating a reference color difference quantity guide using spot colors of interest from at least a portion of said first section of said sorted list and their respective RCDQ values.

15. The system of claim 14, wherein said first color value comprises a color defined by a standard illumination and standard observer angle, and wherein said second color value is obtained from measurements of test patches of said respective spot colors printed using said color marking device in which an RCDQ value is to be determined.

16. The system of claim 14, wherein said first color value is obtained determined from L*a*b* values calculated from spectral data of said respective spot color for said reference illumination and reference observer angle, and wherein said second color value is obtained from L*a*b* values calculated from spectral data for each of said plurality of illuminations and observer angles.

17. The system of claim 14, wherein said reference illumination comprises a plurality of illuminants and wherein said reference observer angle comprises a plurality of observer angles.

18. The system of claim 14, wherein said first color value is obtained from a colorimeter, and wherein said second color value is obtained using a spectral color model of said reference color marking device, said spectral color model capable of determining at least one color value for each of said plurality of illuminations and observer angles.

19. The system of claim 14, wherein obtaining said second color value comprises:
printing a test patch of said spot color using said reference color marking device; and
measuring said second color value from said printed test patch using any of: a spectrophotometer, a colorimeter, and a scanner.

20. The system of claim 14, wherein calculating said RCDQ value for each spot color of interest further comprises calculating a RCDQ value for each of: a printer type, a media type, and a halftone screen.

21. The system of claim 14, wherein generating said reference color difference quantity guide comprises any of:
printing, using an image output device, at least said first section of said sorted list to produce a hardcopy;
communicating at least said first section of said sorted list over a network to a remote computer system;
storing at least said first section of said sorted list to storage device; and
displaying at least said first section of said sorted list on a display device.

22. The system of claim 14, wherein said first color value is obtained from a colorimeter, and wherein said second color value is determined using a color model of said reference color marking device.

23. The system of claim 22, wherein said color model comprises a spectral color model being capable of determining at least one color value for each of said plurality of illuminations and observer angles.

24. The system of claim 14, further comprising:
querying said reference color difference quantity guide in response to a desired spot color having been chosen for use by a target color marking device;
providing, in response to said querying, said desired spot color's respective RCDQ value;
determining whether said desired spot color's respective RCDQ value is in said first section of said sorted list; and
providing, in response to said desired spot color's RCDQ value not being in said first section of said sorted list, a notification that said desired spot color has been determined to have an increased likelihood of reference color difference quantity divergence.

25. The system of claim 14, wherein calculating said RCDQ value comprises calculating any of: an average, 95%, and a maximum color dispersion, for each of said plurality of illuminants.

* * * * *